Nov. 14, 1961  R. S. HINSEY  3,008,345
MECHANISM CONTROL
Filed Nov. 23, 1956  3 Sheets-Sheet 1
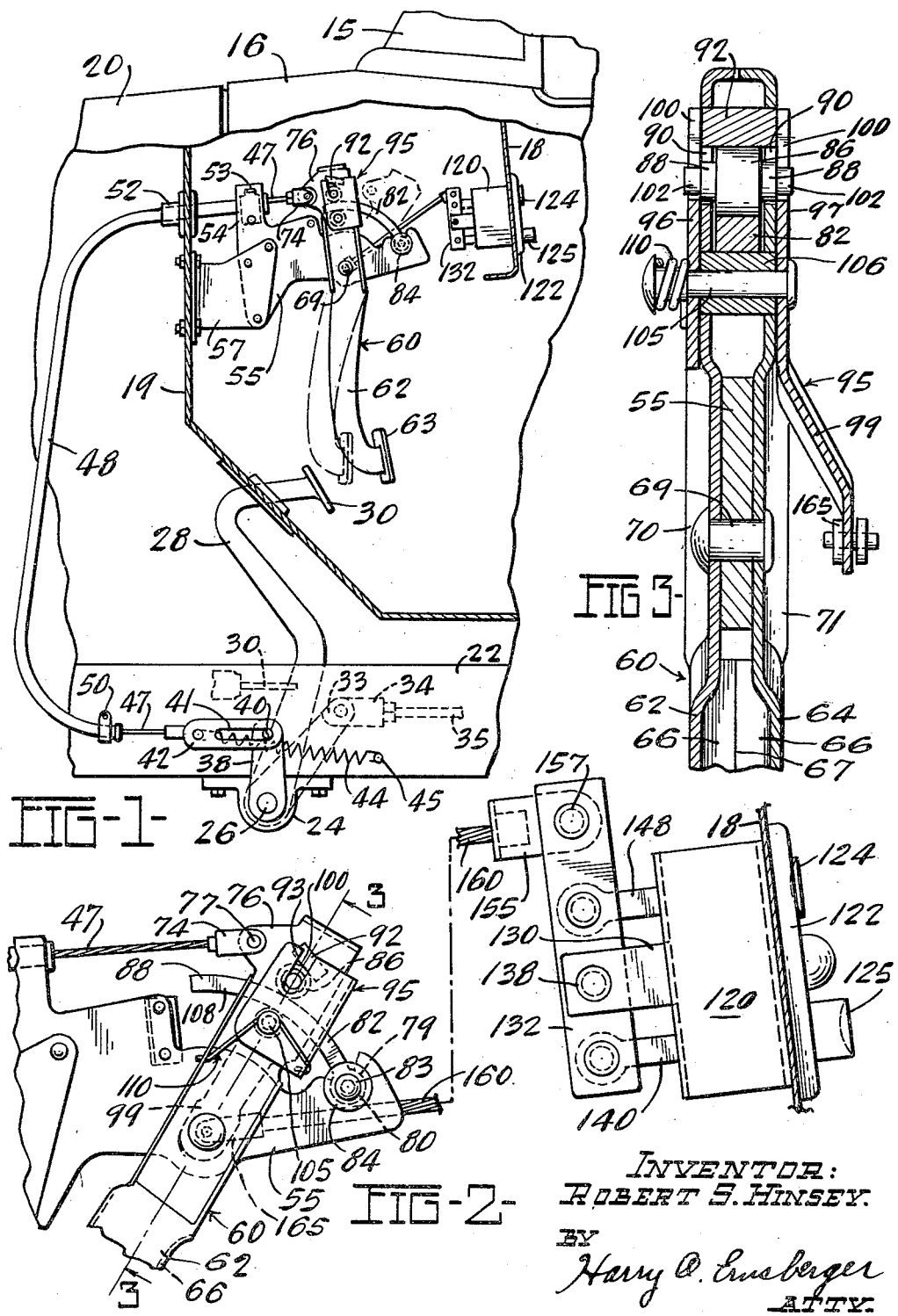
INVENTOR:
ROBERT S. HINSEY.
BY
Harry O. Ernsberger
ATTY.

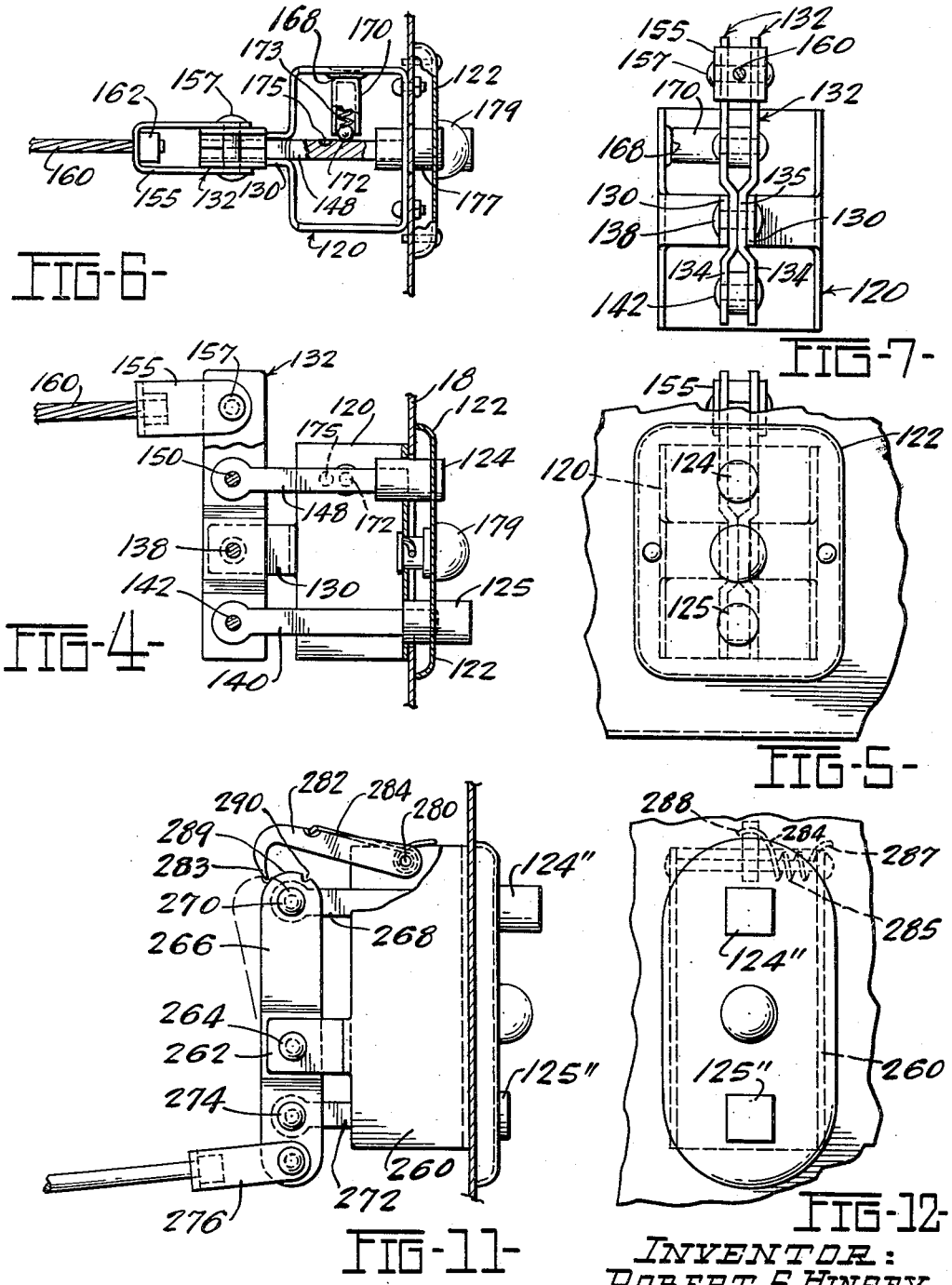

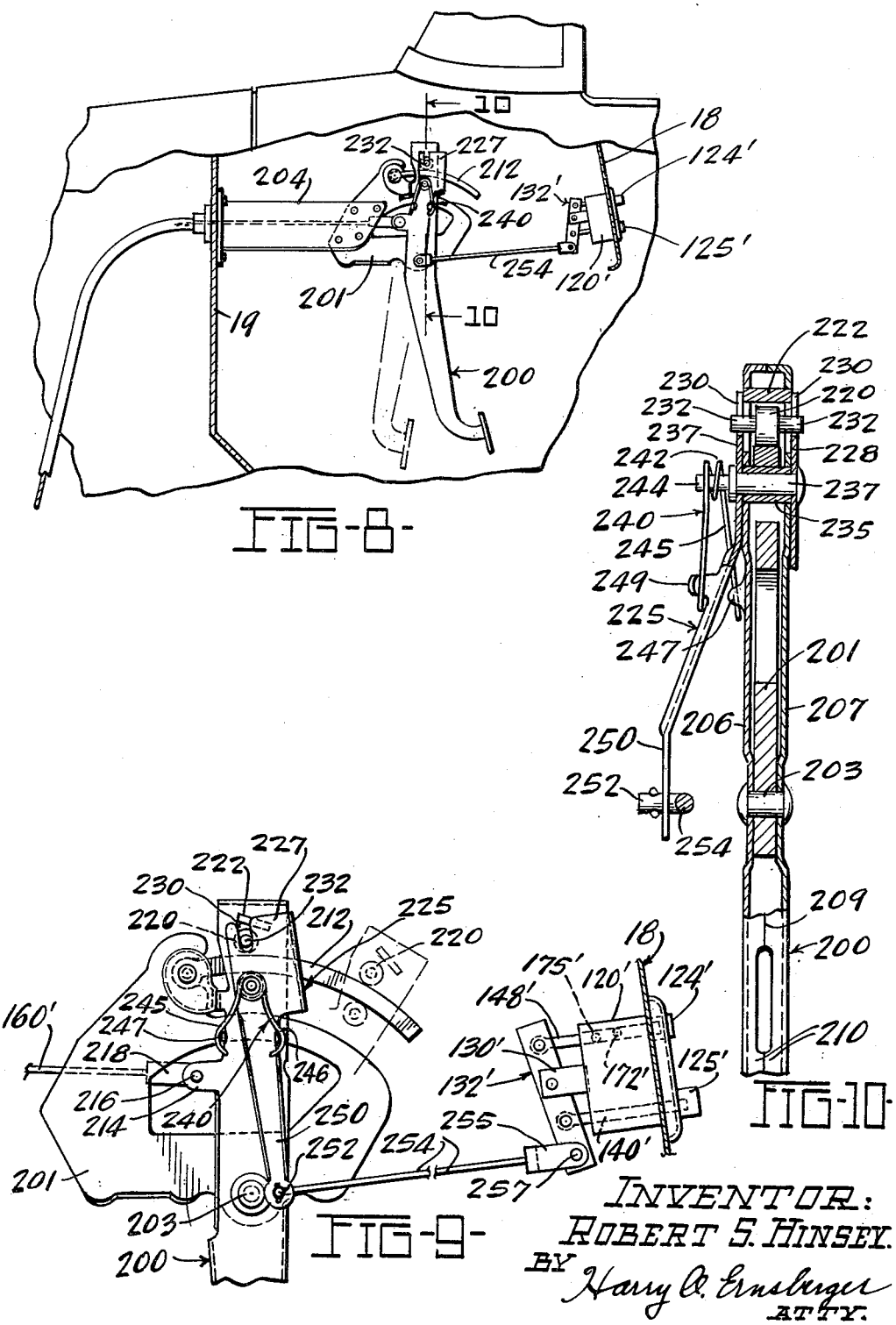

United States Patent Office 3,008,345
Patented Nov. 14, 1961

3,008,345
MECHANISM CONTROL
Robert S. Hinsey, Toledo, Ohio, assignor, by mesne assignments, to The Bingham-Herbrand Corporation, a corporation of Ohio
Filed Nov. 23, 1956, Ser. No. 624,007
6 Claims. (Cl. 74—529)

This invention relates to mechanism controls and more especially to a means for actuating or controlling the emergency or parking brake mechanism of a vehicle.

The invention comprehends or embraces the provision of a foot operated lever or pedal construction embodying a means for retaining the lever or pedal in a position of adjustment wherein the lever or pedal retaining means is arranged to be actuated or controlled by a push button or plunger mechanism.

Another object of the invention is the provision of a foot operated lever construction associated with a clutch means for holding the lever in any position of adjustment, the arrangement including means for rendering the clutch means effective or ineffective and adapted to be controlled by push button mechanism.

Another object of the invention resides in a locking or clutch means for a foot operated lever mechanism which may be controlled through the manipulation of a flexible cable enabling the utilization of push button actuating and release means for the lever locking or clutch means.

Another object of the invention is the provision of a control for a foot operated vehicle parking brake requiring a minimum of effort for its operation and which embodies means for securing or maintaining the lever locking or clutch means in an ineffective position whereby the brake actuating means may be utilized independently of the locking or clutch means.

Still another object of the invention is the provision of a control for a vehicle brake actuating means which embodies push button mechanism suitable for mounting upon the vehicle instrument panel or in other positions convenient for manipulation by the vehicle operator.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an elevational view partly in section illustrating a portion of the operators compartment of an automotive vehicle showing a form of mechanism control of the invention;

FIGURE 2 is an elevational view of a portion of the brake actuating mechanism and control means therefor shown in FIGURE 1;

FIGURE 3 is an enlarged transverse sectional view taken substantially on the line 3—3 of FIGURE 2;

FIGURE 4 is a sectional view of the push button or plunger control mechanism illustrated in FIGURE 2;

FIGURE 5 is a front elevational view of the control means illustrated in FIGURE 4;

FIGURE 6 is a top plan view of the arrangement shown in FIGURE 4;

FIGURE 7 is a rear view of the lever or pedal control mechanism shown in FIGURE 4;

FIGURE 8 illustrates a modified form of lever mechanism and control for brake mechanism;

FIGURE 9 is an elevational view of the lever locking means of FIGURE 8 shown in lever release position;

FIGURE 10 is a sectional view taken substantially on the line 10—10 of FIGURE 8;

FIGURE 11 is a side elevational view showing a modified form of lever-locking control means, and FIGURE 12 is a front elevational view of the lever-locking control means shown in FIGURE 11.

While the form of the mechanism control of the invention is illustrated as associated with an automotive vehicle for setting, actuating or controlling the emergency or parking brakes of a vehicle, it is to be understood that the arrangement and control mechanism of the invention may be utilized in conjunction with other apparatus or mechanism wherever the invention may be found to have utility.

Referring to the drawings in detail and initially to FIGURE 1, there is illustrated a portion of the operator's compartment of an automotive vehicle, the latter including a windshield 15, a cowl 16, an instrument panel 18, a firewall or dash board 19 and a hood or bonnet 20 the latter forming an enclosure for the engine or prime mover of the vehicle.

A portion of the frame of the vehicle is illustrated at 22 and illustrates one of a pair of side members of the frame construction. Secured to the frame members 22 are brackets 24 which journally support a transversely extending shaft 26. Journalled upon the shaft 26 is a service brake pedal 28 having a foot pad portion 30 for manipulating the same. The pedal 28 serves as a conventional service brake actuator and may be connected to the brakes of all four wheels of the vehicle through a rod 30 and suitable hydraulic actuating means for the brakes.

While the emergency or parking brake mechanism of a vehicle may be connected with the hydraulic brake mechanism, it is usual that the brakes of the vehicles used for parking purposes be actuated by mechanical means.

With an arrangement of the above mentioned, character, there is secured to the transversely extending shaft 26 an arm 33 connected by means of a clevis 34 and a rod 35 with the brakes associated with at least one pair of vehicle wheels.

Also secured on the shaft 26 is an arm 38 provided at its distal end with a pin 40 which extends into a slot 41 formed in a clevis member 42. One end of a contractile spring 44 is connected to the clevis member 42, the other end of the spring being anchored to a frame member 22 as at 45 or secured to another portion of the vehicle.

The spring 44 biases the clevis member 42 in a right hand direction as viewed in FIGURE 1 to urge the parking brake mechanism hereinafter described to brake-release position. The clevis member 42 is connected to an end of a flexible cable or brake connecting means 47, the cable being slidably disposed within a sheath or tubular guide 48. One end of the sheath is secured to one of the frame members 22 by means of a clamp or bracket 50.

The other end region of the sheath extends through a grommet 52 formed of rubber or other flexible material and is secured by means of a clamp 53 to an upwardly extending portion 54 of a pedal or lever support 55. The conventional brake mechanism providing the parking or emergency connected with the brake rod 35 is inclusive of additional spring means (not shown) biasing the brake mechanism toward released position.

The support 55 for the brake actuating and control means therefor may be fixedly carried upon any suitable structure in the operator's compartment. In the embodiment shown in FIGURE 1, the mechanism control support 55 is secured to a bracket or member 57 which is mounted upon the dash board or fire wall 19 by suitable means.

The means for actuating the parking or emergency brake mechanism is inclusive of a foot-operated lever, pedal or lever construction 60. As illustrated in FIGURES 1 and 2 the lever construction 60 is fashioned of matched or mating sheet metal sections 62 and 64 as particularly shown in FIGURE 3. The sections are provided with inwardly extending flanges or flange portions 66 which are welded together at a juncture line 67 shown in FIGURE 3.

The matched sections 62 and 64 of the lever construction straddle the support 55 as shown in FIGURE 3. The lever sections and the support 55 are provided with registering openings to receive a pin or rivet 69 which forms a fulcrum or pivotal support for the lever. The edge zones of sections 62 and 64 adjacent the fulcrum 69 are formed with outwardly extending flanges 70 and 71 forming U-shaped configurations to impart strength and rigidity to the lever.

The upper end of the flexible cable 47 is equipped with a clevis 74 which is connected to parallel projecting portions 76 of the lever construction 60 by means of a pin 77 extending through aligned openings in the clevis 74 and the projections 76. Thus pressure applied to the foot pad 63 provided at the lower end of the lever construction 60 in a left hand direction as viewed in FIGURE 1 swings the lever construction 60 about the axis of the fulcrum pin 69, exerting a longitudinal pull upon the flexible cable 47 to rotate the shaft 26 and set the parking brakes of the vehicle.

The arrangement of lever construction 60 includes a locking or clutch means for retaining the lever construction in any brake-setting position. The lever support 55 is formed with a circularly-shaped recess or socket 79 which snugly receives a circular disc-like portion 80 formed at the end of a relatively stationary arcuately-shaped clutch member or bar 82. The portion 80 is formed with a central opening which receives a stud or rivet 83, the rivet also extending through openings in discs or washers 84 arranged at each side of the support 55. The washers 84 serve to prevent lateral movement of the clutch member 82. The circular portion 80 snugly fitting in the recess is adapted for swivel movement relative to the support 55 to permit the clutch member 82 to cooperate properly with a second clutch member 86.

The second clutch member 86 is in the form of a roller which is arranged for cooperation with an arcuate surface 88 of the clutch member 82. As particularly shown in FIGURE 3, the roller or clutch member 86 is formed with shoulder portions 88, the shoulder portions being disposed in vertically elongated slots 90 formed in the upper end regions of the lever components or sections 62 and 64.

The lever sections are also formed with substantially rectangular openings to receive and accommodate a rectangular block 92 or abutment member forming a component of the clutch means and is adapted to engage and cooperate with the clutch roller or member 86. With particular reference to FIGURES 1 and 2, it should be noted that the surface 93 of the abutment 92 is angularly arranged with respect to an adjacent tangent to the surface 88 of the arcuate member 82 providing a wedge-like configuration for cooperation with the roller 86 to hold the lever member 60 in adjusted or brake-setting positions.

The angle of general convergence of the clutch surfaces 88 and 93 is such as to provide, with the roller 86, a friction means for locking the lever in any position. The arrangement includes means for controlling or actuating the clutch roller or member 86 to effect a release of the brake mechanism. The actuating or control means for the clutch roller 86 is inclusive of a U-shaped member, arm or supplemental lever 95.

The supplemental lever or clutch actuator 95 is configurated with parallel wall portions 96 and 97 which straddle the upper region of the lever construction 60, one of the wall portions 97 being formed with an integral extension or arm portion 99 as shown in FIGURES 2 and 3. The upper portions of the spaced walls 96 and 97 are each provided with an open ended slot 100 into which extend cylindrical tenons or tenon portions 102 formed integrally with the clutch roller 86.

The slots 100 are elongated in a direction lengthwise of the lever 60 so as to provide for movement of the clutch roller 86 lengthwise of the slots to assure a wedging engagement of the clutch roller with the clutch surfaces 88 and 93. The edge walls defining the slots 100 are of a dimension to snugly accommodate the tenons 102 without appreciable lost motion in a direction normal to the walls of the slots.

The wall portions 96 and 97 of the clutch control member 95 are formed with openings to receive a stub shaft or rivet 105 whcih also forms a journal support for a sleeve or roller 106, the exterior surface of which engages a surface 108 of the member 82 forming an abutment for the member 82. The rivet 105 forms a fulcrum for pivotally supporting the clutch control lever 95 upon the lever 60.

Spring means is provided for normally biasing the clutch control member 95 in a clockwise direction about its fulcrum 105, as viewed in FIGURE 2, so as to bias the roller 86 into wedging engagement between the clutch surfaces of the arcuate member 82 and the rectangular abutment block 92. A spring 110 has a central portion circumscribing the rivet 105 and having its ends connected respectively to the lever 60 and the clutch control member 95 in the manner shown in FIGURE 2. The spring 110 is stressed in a direction to normally urge or bias the clutch control member 95 for rotation in a clockwise direction about the fulcrum 105 as viewed in FIGURE 2.

Means is connected with the clutch control member 95 for actuating the member 95 to effective or ineffective clutch-retaining positions and an important feature is the provision of a depressible means or push-button control mechanism especially adapted for mounting on or adjacent the instrument panel of the vehicle.

With particular reference to FIGURES 1 and 2, there is secured to the instrument panel 18 a substantially rectangular sheet metal housing or bracket 120 and an escutcheon 122 disposed forwardly of the instrument panel, the escutcheon being provided with openings to accommodate control or push buttons or members 124 or 125. As shown in FIGURES 4, 6 and 7, the rear of the housing 120 is formed or provided with rearwardly extending parallel projections 130.

Disposed between the projections 130 is a lever or beam construction 132 formed of matched sheet metal members 134 as shown in FIGURE 7. The central portions 135 of members 134 are in contiguous relation and may be welded together to form a single member. The lever member 132 is fulcrumed upon a rivet 138 extending through aligned openings formed in the central portions 135 of the member 132 and the projections 130.

Disposed between spaced portions of members 134 at one side of the fulcrum or rivet 138 is a bar or member 140 which is pivotally connected to member 132 by means of a rivet or stub shaft 142. The bar 140 extends through the housing 120, the forward end region of the bar being equipped with a push button or depressible control button 125.

Disposed at the opposite side of the projections 130 is a bar or rod 148 which is pivotally connected to the beam or lever 132 by means of a rivet 150. The bar 148 extends forwardly through the sheet metal housing or bracket 120 and has its forward end region equipped with a push or control button 124.

A clevis member 155 is disposed with its side wall portions straddling the end region of member 132 and is pivotally connected thereto by means of a rivet 157. A flexible means such as a flexible metallic cable 160 is anchored at one end to the clevis 155 by means of an anchor member 162, the opposite end of the cable being secured to a clevis member 165 which is connected by a pin 166 to the distal end of the arm 95.

The bracket or housing 120 is equipped with means for resiliently holding or retaining the clutch control arm 95 and the roller clutch 86 in an ineffective position, in which position the pedal lever 60 may be operated as a service brake pedal. As particularly shown in FIGURES 6 and 7, the bracket 120 is formed with an inwardly extending raised or bossed portion 168 to which is welded or otherwise fixedly secured a cup-shaped member 170. Disposed in the cup-shaped member 170 is a detent member or ball 172 which is biased in a direction toward the bar 148 by an expansive coil spring 173.

As shown in FIGURE 6, the bar 148 is formed with a spherically shaped recess or depression 175 of a dimension to receive the ball member 172 when the bar 148 is moved to a position bringing the recess 175 into registration with the ball member 172.

The escutcheon 122 may be equipped with a socket member 177 to accommodate a small electrically-energizable pilot lamp (not shown) for indicating "brake set" condition of the mechanism. The lamp is preferably enclosed in a transparent envelope or cover 179 which may be fashioned of glass, plastic or other, suitable light transmitting material, the lamp being energized by switch means (not shown) associated with the lever construction 60.

The operation of the arrangement shown in FIGURES 1 through 7 inclusive is as follows:

FIGURE 1 illustrates the position of the actuating or control mechanism for the parking brakes when the latter are in fully released position. It should be noted in this position of the lever or beam 132 that the control button 124 carried by the bar 148 is in its innermost position and the control button 125 carried by bar 140 is in its outermost position.

When it is desired to set the brakes for parking purposes, the operator exerts pressure upon the foot pad 63, swinging the lever member or construction 60 about its fulcrum 69 exerting a "pull" on the cable 47 swinging the arms 33 and 38 to set the brakes through longitudinal movement of the brake rod 35. When the lever construction 60 is moved to a brake setting position as illustrated in FIGURE 2, the spring member 110 biases the clutch control member or arm 95 to a position urging the clutch roller 86 into wedging engagement between the rectangular block or abutment 92 and the arcuately shaped arm 82. The clutch roller in this position frictionally or wedgingly holds the lever 60 in a position to retain the brakes in "set" position.

As the axis of the connection of clevis 165 with the arm 95 is coincident or aligned with the axis of the fulcrum 69 of the lever, the movement of the lever 60 does not affect the positions of the beam 132 or control buttons 124 and 125.

To effect a release of the brakes, that is, returning the lever 60 to its full line position shown in FIGURE 1, the operator simply depresses the control button 125 a slight amount which movement swings the beam or lever 132 in a clockwise direction as viewed in FIGURES 1 and 2 in effect longitudinal movement of the cable 160 in a right hand direction which causes a rotating movement of the clutch control member 95 about its support or fulcrum 105 in a counterclockwise direction. This action swings or moves the clutch roller 86 out of wedging or frictional engagement with the abutment block 92 and the arcuate bar 82 so that the lever 60 may be returned to "brake-release" position under the biasing tension in the spring 33 and the spring arrangements (not shown) embodied in the brake shoe constructions at the vehicle wheels. Only a slight movement of the beam 132 and cable 160 is required to release the clutch or retaining means 86, a distance insufficient to move the bar 148 to bring the socket 175 in registration with the ball or detent 172.

When the operator wishes to set the brake mechanism connected with the pedal lever construction 60 without involving the use of the clutch roller 86 for holding the lever construction in brake "set" position, the operator pushes or depresses the control button 125 to its innermost position. This operation swings the beam or lever 132 in a clockwise direction as viewed in FIGURES 1, 2 and 4, bringing the recess or depression 175 in the bar 148 into registration with the ball or detent 172.

In a position of registration, the ball 172 enters the recess 175 under the biasing pressure of the expansive spring 173. The ball 172, being retained in the cup-like member 170, retains the bar 148 in a position wherein the cable 160 holds clutch actuating lever or arm 95 in a position with the clutch roller 86 out of clutching or locking engagement with the block 92 and the bar 82. This condition of the mechanism obtains until the operator depresses the control button 124 to disengage the detent or ball 172 from the recess 172, releasing the cable 160 so that the clutch-actuating arm or lever 95 is moved about its fulcrum 105 under the influence of the spring 110 to engage the clutch roller with the block 92 and bar 82 to reestablish a locking position of the clutch effective to hold the lever construction 60 in any position of brake-setting adjustment.

It will be noted that with this arrangement, complete control over the means for holding the clutch actuating lever 95 in effective or ineffective positions is carried out through the actuation of depressible members or push buttons 124 and 125, providing an efficient means for exercising such control.

FIGURES 6 through 10 inclusive illustrate a modified form of pedal lever construction and control therefor. In the form shown in FIGURES 8 through 10 the lever construction 200 is fulcrumed upon a support 201 by means of a rivet or stub shaft 203. The lever support 201 is carried by bracket 204 secured to the dash board 19 of the vehicle.

The lever construction 200 is similar to that shown in FIGURES 1 through 3 and is inclusive of matched sheet metal sections 206 and 207 welded together at the meeting or juncture line 209 of flanges 210 extending laterally from the lever sections 206 and 207.

The lever sections 206 and 207 straddle the support 201. Pivotally secured to the lever support or bracket 201 is an arcuately shaped bar 212 articulately secured to the support in a manner similar to that hereinbefore described in connection with the form shown in FIGURE 2.

The matched sections 206 and 207 of the lever 200 are formed with projections 214 formed with openings to receive a pin 216 securing a clevis member 218 to the lever construction. The clevis member 218 is connected to the parking brake mechanism by means of the flexible cable 160'.

The lever 200 is adapted to be held or retained in brake-setting positions by means similar to that embodied in the form of the invention shown in FIGURES 1 through 3. This means, in the form of the invention shown in FIGURES 8 through 10, is inclusive of a clutch roller or lever locking member 220 adapted for engagement with the upper arcuate surface of the bar 212 and with the lower surface of an abutment block 222 secured in the upper end regions of the components 206 and 207 of the lever construction.

The relative position of the clutch roller 220 is controlled by means of a clutch actuator or control member 225 formed with parallel wall portions 227 and 228 which straddle the upper region of the lever 200. The parallel walls 227 and 228 of member 225 are formed with open ended slots 230 which accommodate tenons 232 extending laterally and axially of the clutch roller 220 as shown in FIGURES 9 and 10.

The sections 206 and 207 of the lever 200 are formed with aligned openings to receive a sleeve or cylindrical bushing 235 as shown in FIGURE 10. A rivet or stub shaft 237 extends through the sleeve 235 and openings formed in the walls 227 and 228 of clutch control means 225, the rivet 237 forming a fulcrum or pivotal support for the clutch control member 225.

A spring or resilient means 240 has a central region 242 coiled or looped about an extension 244 formed on the rivet 237, the spring being formed with leg portions 245 and 246. The leg portion 245 engages a lug or projection 247 formed on the lever section 206 and the leg portion 246 engages an ear or projection 249 formed on the clutch actuator or control member 225.

The spring 240 is biased in a direction to rotate the clutch actuator 225 in a clockwise direction, as viewed in FIGURE 9, urging the roller 220 into frictional or wedging engagement with the bar 212 and the abutment block 222 to hold or retain the lever 210 in adjusted or brake-setting positions. The sleeve 235 shown in FIGURE 10 forms an abutment or backing member for the arcuately-shaped bar or member 212.

A depending arm 250 of the clutch actuator is connected to an end portion 252 of a control rod 254, the portion 252 being arranged at right angles to the major portion of the rod 254 and extending into an opening formed in the depending portion 250 of the actuator 225. When the clutch roller 220 is in lever retaining position, the axis of the rod portion 252 is normally aligned with the axis of the lever fulcrum member 203 so that the clutch means is effective to hold the lever in any position of adjustment.

The control rod 254 is adapted to be actuated by a push button control mechanism substantially the same as that hereinbefore described and shown in FIGURES 4 through 7. In the arrangement shown in FIGURE 9, a clevis 255 is connected by means of a pin 257 to a depending extension of the beam or lever 132'. The beam 132' is pivoted to projections 130' formed on the sheet metal housing or bracket 120', the latter being secured to the instrument panel 18 or other portion of the vehicle in a position to be conveniently manipulated by the vehicle operator. The position of the beam 132' is controlled by depressible buttons 124' or 125'.

The clutch control member 225 may be resiliently held in clutch releasing position by engagement of a ball or detent 172' engageable in a recess 175' formed in the plunger or rod 148'.

The control means for the clutch roller 220 and the clutch actuator or control member 225 is similar to the arrangement in the form of the invention shown in FIGURES 1 through 3 excepting however that depression of the button 124' moves the clutch control member 225 and clutch roller 220 to an ineffective position whereby the lever 200 may be freely moved or manipulated without being held in brake set position.

Depression of the button 125' moves the bar 148' to disengage the detent 172' from the recess 175' whereby the clutch control member or supplemental lever 225 moves under the influence of the biasing spring 240 to effective clutching position. The clutch control member 225 is normally maintained, under the influence of the spring 240, in an effective clutching or lever retaining position.

When the lever 200 has been moved to brake-setting position as shown in broken lines in FIGURE 9, the clutch roller 220 may be released by slight inward movement or depression of the button 124', which movement swings the member 225 to disengage the roller from frictional contact with the bar 212 and the block 222, the springs associated with the brake mechanism returning the lever 200 to brake released position. In order to effect continued release of the lever, the button 124' is depressed a distance sufficient to bring the socket 175' in engagement with the detent 172' so that the clutch roller is held out of clutching or lever retaining position.

A modified form of means for holding the clutch control member and mechanism in clutch-release position is illustrated in FIGURES 11 and 12. In this form of control the sheet metal housing 260 is formed with projections 262 which are provided with aligned openings to receive a rivet or stub shaft 264 forming the fulcrum for the beam or lever 266.

A bar 268 is pivotally connected by a pin or rivet 270 with the upper end of the beam 266, and the lower bar 272 is pivotally connected by a pin or rivet 274 with the beam 266. The bars 268 and 272 are respectively provided with control buttons 124" and 125".

It should be noted that the fulcrum 264 of the beam 266 is closer to the pivotal connection of the bar 272 with the beam than the pivotal connection of the bar 268 therewith whereby a motion multiplying means is embodied in the arrangement and minimizing the effort required in depressing the button 124" to effect a release of the clutch control.

The clutch control member pivotally carried by the brake actuating lever may be connected to the beam 266 by means of a clevis 276. The clevis 276 may be connected to the clutch control means either by a rod or flexible cable where a pull on the rod or cable effects a disengagement of the lever retaining clutch means to release the lever.

The arrangement shown in FIGURE 11 includes a modified form of means for holding the clutch control mechanism in ineffective position. Extending through openings formed in the side wall portions of the bracket or housing 260 is a shaft or pin 280 which forms a pivotal support for a pawl or dog 282 having a detent portion 283 disposed adjacent and engaging the upper curved end region of the beam 266. The pawl 282 is resiliently biased toward the beam 266 by means of a spring 284 having a central region 285 coiled or looped about the pin 280 and having its ends 287 and 288 engaging respectively a side wall of the bracket 260 and the pawl 282.

The curved end surface of the beam 266 is formed with a depression, socket or recess 290 as shown in FIGURE 11 which is adapted, upon full depression or inward movement of the button 124" to receive the detent portion 283 of the pawl member 282.

Thus when the vehicle operator wishes to utilize the parking brake actuating lever as a service brake, he is enabled to render the lever retaining clutch means ineffective by depressing the button 124" until the detent 283 engages in the socket 290 to hold the clutch control means in clutch releasing position.

It is to be understood that the forms of push button clutch control means may be utilized with both forms of pedal lever construction disclosed and with other similar forms of lever construction.

It is apparent that, within the scope of the invention, modifications and different arrangements may be made other than is herein disclosed, and the present disclosure is illustrative merely, the invention comprehending all variations thereof.

I claim:

1. Mechanism for controlling the parking brakes of a vehicle including, in combination, a support, a foot-operated lever mounted for pivotal movement relative to the support, means disposed adjacent the lever adapted to retain the lever in various positions of adjustment, a member pivotally supported on the lever movable relative to said lever and having operative connection with said lever retaining means, control means for moving said member independently of the lever, resilient means effective to normally bias the lever retaining means toward lever retaining position, said control means including a first depressible element for effecting a release of the lever retaining means, a second depressible element for moving said first depressible element to a position rendering effective said lever retaining means, and means engageable with one of the depressible elements arranged to resiliently hold the said depressible element in a position of release of the lever retaining means.

2. Mechanism for controlling the parking brakes of a vehicle including a support, a foot operated lever mounted for pivotal movement relative to the support, clutch means cooperatively associated with said lever for holding the lever in adjusted position, an arm pivotally supported by the lever engageable with the clutch means, a clutch control means including a member spaced from the lever, a pivotal support for said member, a link operatively connecting the member with the arm, and an element pivotally connected with said pivotally supported member and arranged to be manually depressed to effect a release of the clutch means.

3. Mechanism for controlling the parking brakes of a vehicle including, in combination, a lever pivotally mounted on said support, clutch surfaces associated with said support and said lever, clutch means associated with the lever and engageable with said surfaces for retaining the lever in various positions of adjustment, a member movably supported upon said lever and having operative connection with said clutch means, means effective to bias the clutch means into clutching engagement with said surfaces, control means for said member, said control means including a bracket spaced from the lever, a beam fulcrumed intermediate its ends on said bracket, a motion transmitting link pivotally connected with the beam at one side of its fulcrum and connected with said member, a pair of plungers pivotally connected with the beam at opposite sides respectively of its fulcrum and arranged to be selectively manually depressed for rendering effective and ineffective the clutch means.

4. Mechanism for controlling the parking brakes of a vehicle including, in combination, a lever pivotally mounted on said support, clutch surfaces associated with said support and asid lever, clutch means associated with the lever and engageable with said surfaces for retaining the lever in various positions of adjustment, an arm pivotally supported upon said lever and having operative connection with said clutch means, resilient means effective to bias the clutch means into clutching engagement with said surfaces, control means for said arm, said control means including a relatively stationary bracket spaced from the lever, a beam fulcrumed intermediate its ends on said bracket, a motion transmitting element connecting the beam with the member, a pair of manually actuable plungers connected with the beam at opposite sides of its fulcrum and being selectively depressible to render said clutch means effective or ineffective to retain the lever in adjusted positions, and resilient means rendered effective upon substantial movement of one of said depressible plungers and cooperable with the control means for retaining the clutch means in ineffective position.

5. Mechanism for controlling the parking brakes of a vehicle including, in combination, a support, a foot operated lever pivotally mounted on said support, clutch surfaces associated with said support and said lever, clutch means associated with the lever and engageable with said surfaces for retaining the lever in various positions of adjustment, a clutch actuating arm pivotally supported upon said lever and having operative connection with said clutch means, resilient means effective to urge the clutch means into clutching engagement with said surfaces, control means for said arm, said control means including a second support spaced from the lever, a beam pivotally supported intermediate its ends upon the second support, a pair of manually actuated depressible plungers respectively connected to said beam at each side of its pivotal connection with the second support, means including a flexible cable connecting the clutch actuating arm with the beam, and detent means cooperable with one of the plungers for retaining the clutch actuating arm in clutch releasing position.

6. Mechanism for controlling the parking brakes of a vehicle including, in combination, a support, a foot operated lever pivotally mounted on said support, clutch surfaces associated with said support and said lever, clutch means associated with the lever and engageable with said surfaces for retaining the lever in various positions of adjustment, a clutch actuating arm movably supported upon said lever and having operative connection with said clutch means, resilient means effective to urge the clutch means into clutching engagement with said surfaces, control means for said arm, said control means including a second support spaced from the lever, a beam pivotally supported intermediate its ends upon the second support, a pair of manually depressible plungers respectively connected to said beam at each side of its pivotal connection with the second support, a rod connecting the clutch actuating arm with the beam, resiliently biased detent means cooperable with one of the plungers for retaining the clutch actuating arm in clutch releasing position.

References Cited in the file of this patent

UNITED STATES PATENTS

| | | |
|---|---|---|
| 1,157,310 | Klein | Oct. 19, 1915 |
| 1,232,793 | Grimes | July 10, 1917 |
| 1,290,199 | Holland | Jan. 7, 1919 |
| 1,786,935 | Burgess | Dec. 30, 1930 |
| 1,876,824 | Adam | Sept. 13, 1932 |
| 2,308,898 | Skareen | Jan. 19, 1943 |
| 2,309,454 | Heller | Jan. 26, 1943 |
| 2,566,859 | Seeler | Sept. 4, 1951 |
| 2,587,725 | Hinsey | Mar. 4, 1952 |
| 2,750,994 | Howell | June 19, 1956 |
| 2,781,117 | McLeod | Feb. 12, 1957 |
| 2,821,275 | Martin | Jan. 28, 1958 |
| 2,923,169 | Hinsey | Feb. 2, 1960 |

FOREIGN PATENTS

| | | |
|---|---|---|
| 620,334 | Great Britain | Mar. 23, 1949 |